(No Model.) 2 Sheets—Sheet 1.

A. W. MITCHELL.
HAND OPERATING MECHANISM FOR ELECTRIC LOCOMOTIVES.

No. 530,956. Patented Dec. 18, 1894.

WITNESSES:
Harry E. Nichols
E. M. Tuttle

INVENTOR:
Andrew W. Mitchell
Per Edwin W. Brown
ATTY.

THE NORRIS PETERS CO., PHOTO-LITHO., WASHINGTON, D. C.

(No Model.) 2 Sheets—Sheet 2.

A. W. MITCHELL.
HAND OPERATING MECHANISM FOR ELECTRIC LOCOMOTIVES.

No. 530,956. Patented Dec. 18, 1894.

WITNESSES:
Carrie E. Nichols.
E. M. Tuttle

INVENTOR:
Andrew W. Mitchell
Per Edwin W. Brown.
ATTY.

UNITED STATES PATENT OFFICE.

ANDREW W. MITCHELL, OF BOSTON, MASSACHUSETTS.

HAND OPERATING MECHANISM FOR ELECTRIC LOCOMOTIVES.

SPECIFICATION forming part of Letters Patent No. 530,956, dated December 18, 1894.

Application filed April 14, 1892. Serial No. 429,180. (No model.)

*To all whom it may concern:*

Be it known that I, ANDREW W. MITCHELL, of Boston, in the county of Suffolk and State of Massachusetts, have invented certain new and useful Improvements in Brakes for Electric Cars, of which the following is a full, clear, and exact description.

The object of the present invention is to combine the mechanism for operating the electric current in an electric car with the brake apparatus, so that both the electric current and the brake mechanism of an electric car can be controlled and operated by using one crank and that the brake, so that as the motorman operates the brake to brake the car it will at the same time move the mechanism to break the circuit to stop the operation of the electric motor, and as he releases the brake mechanism, the circuit will again be made and the power of the electric motor applied to the car and with no more care or thought of the motorman than if he were driving a horse car, and the invention consists in an electric car of mechanism so constructed and arranged and connected with the arm or rod of the regular brake of the car, that the operation of the brake rod to brake the car will not only brake the car and stop its movement, but will also shut off or cause the electric current to be broken and stop the electric motor, and in reversing the movement of the brake rod to release the brake, it will also operate the electric mechanism to make the electric circuit and operate the electric motor all substantially as hereinafter fully described, reference being had to the accompanying sheet of drawings, in which is illustrated the present invention as applied to an electric car.

Figure 1:
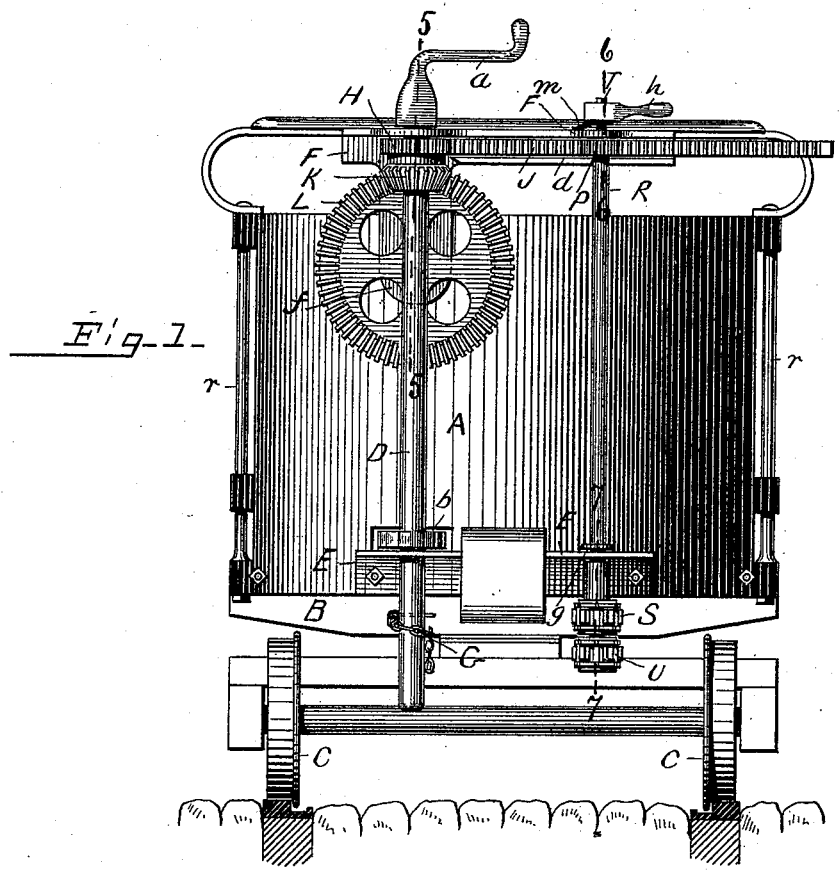
Figure 2:
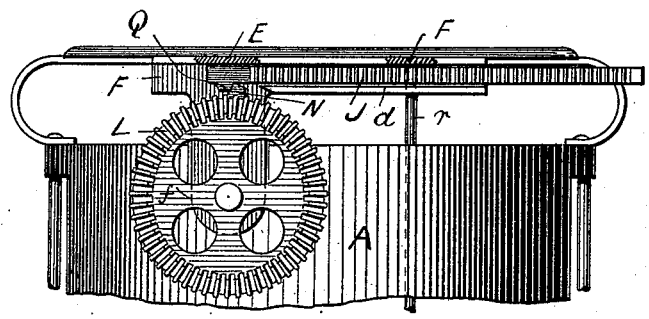
Figure 3:
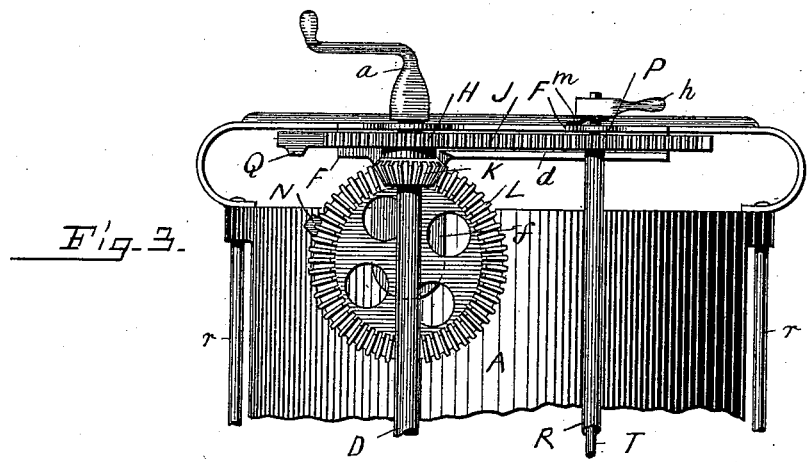
Figure 4:
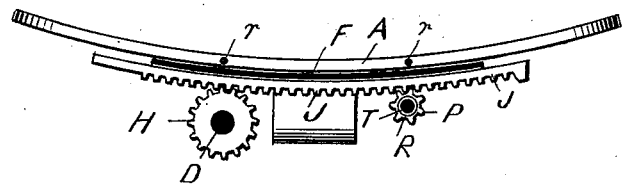
Figure 5:
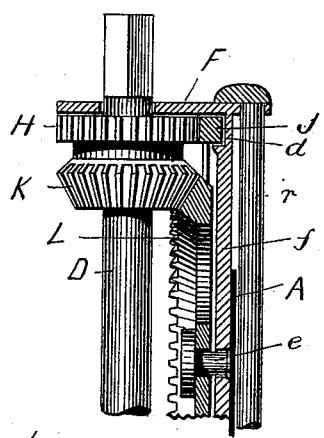
Figure 6:
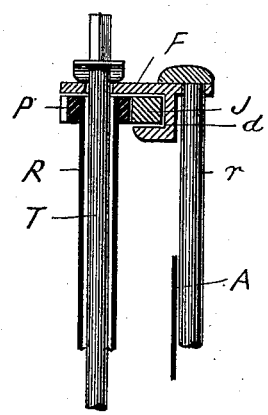
Figure 7:
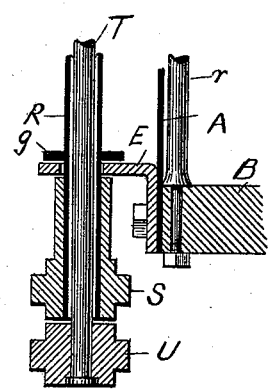

Figure 1, is a front view of the dasher of a street railway car having this improved mechanism applied thereto with the parts in the position of the car at rest and the electric current shut off. Fig. 2, is a similar front view in detail with some of the parts in front removed. Fig. 3, is a similar detail front view to Fig. 2, but with some of the parts moved into different positions. Fig. 4, is a horizontal section on line 4—4, Fig. 3. Fig. 5, is a detail vertical cross section on line 5—5, Fig. 1. Fig. 6, is a detail vertical cross section on line 6—6, Fig. 1. Fig. 7, is a detail vertical cross section on line 7—7, Fig. 1. In Figs. 5, 6 and 7 the parts are enlarged.

In the drawings A represents the dasher secured to the bottom B, and C the wheels of a street railway car constructed as usual, the car itself not being shown.

D is the brake rod having a handle *a* for operation thereof and adapted to turn in bearings in two brackets E, F, one E at the bottom and the other F at the top, and both secured to the dasher or framework, the rod having the usual ratchet wheel *b*, for holding it stationary by the usual pawl which wheel rests on the lower bracket E and prevents downward movement of the brake rod.

G is the usual brake chain attached to the lower end of the brake rod extending back and connecting with the brake in the usual manner.

H is a gear rigidly secured to the brake rod just below the upper bracket F, which prevents any upward movement of the brake rod and it is arranged to engage at certain times with a horizontal rack bar J arranged to move back and forth in a guideway *d*, of the upper bracket F, which extends along the dasher for such support and guidance.

Secured to the brake rod below the gear H is a miter gear K, which engages with a miter gear L adapted to turn vertically by its journal *e*, in a downwardly extending arm *f*, of the rack bar support.

Radially projecting from the periphery of the gear L, is a lug or ear piece N, which at a certain point of the revolution of the gear as it is turned to the left will abut against a downwardly extending lug or ear piece Q, of the rack bar as shown in Fig. 2.

The rack bar is moved to the right in the turning of the brake rod to brake the car and at a certain point passes sufficiently to the right to be disengaged from the brake rod gear H, but just before its disengagement the vertical gear L, will also have turned so that its lug N will pass free and a little ahead of the lug Q, on the rack bar, to be at such time at its right, and in the continued movement of the brake rod to brake the car the rack bar does not move. As the brake rod is turned back to release the brake the lug N on the gear L approaches and striking against the right hand side of the lug Q of the rack bar as shown in Fig. 2, more particularly, moves it sufficiently for the teeth of the bar to again engage with the gear H, which in the continued movement of the brake rod to the left is then moved also to the left. The rack bar near its other end engages with a small horizontal gear P, secured to a tubular vertical rod R, adapted to turn in the brackets F and E, and is prevented from up and down movement by the gear and a shoulder or flange $g$, on the tubular rod.

The tubular rod extends below the bracket E and on its lower end below the bracket E is a sprocket wheel S with which engages a drive chain not shown which runs to and connects with the electric motor of the car in the usual manner of electric cars, the moving of which in one direction makes the electric circuit and puts on the electric power and in the other direction breaks the electric circuit and cuts it off in the usual manner of electric motors for cars and not needing to be described herein. Extending down through this tubular rod R is a rod T, having secured to it on its lower end a sprocket wheel U below the sprocket wheel S, and at its upper end above the tubular rod is a handle $h$, for operation of the rod, the rod turning freely in the tubular rod. Secured to the under side of this handle is a spring $m$, its free end bearing upon the upper surface of the bracket for friction on the rod to prevent its turning accidentally. A drive chain (not shown) connects with this sprocket wheel U and the electric motor in such manner that turning the rod T, by its handle in one direction, the current will be turned on to operate the electric motor, but only to reverse its motion, to back the car, all of which is as usual and forms no part of the present invention and needs no more description herein.

The operation of the device is as follows:—
With the car at rest, the brake loose, the parts are in the position shown in Figs. 1 and 2, and the power from the electric motor is then shut off, and in such a position the rack bar will not be in connection with the brake rod gear H, but nearly so, and the gear L will be in the position shown in Fig. 2, for its lug N to be at the right of the rack bar lug Q, as shown in Fig. 2. To start the car the motor man turns the brake rod to the left, which by its gear K turns the gear L to the left, its lug N engaging with the lug Q, of the rack bar and moving the rack bar J to the left sufficiently for its teeth to engage with the gear H, and in the continued movement of the brake rod to the left the rack bar is also moved to the left, and by its engagement with the gear P, of the tubular rod R, it is caused with its sprocket wheel U, to turn and by its chain connection with the electric motor mechanism, the rheostat or electric controller is operated to make the circuit and the electric power applied to the car. To brake and stop the car, turn the brake rod to the right as usual, which moves the rack bar back and through its gear connection with the tubular rod the sprocket wheel S, is turned in the reverse direction and finally shutting off the electric power and as the brake rod is still continued to move, the brake rod chain operates the brake applied to the car to stop it, and in such movement the rack bar is moved to the right sufficiently for it to be disengaged from the brake rod gear H, leaving it free to turn with the brake rod without effect on the rack bar for the rod to still further turn to brake the car sufficient to stop it, and when the rack bar is disengaged from the brake rod gear H, the tubular rod sprocket wheel S, will have been turned sufficiently for its chain to operate the rheostat to break the electric circuit and thus stop the electric motor. To release the brake it is turned to the left sufficiently to relieve the brake and when desirous of starting the car the brake rod is still farther turned to the left which then brings the vertical gear into such position that its lug or ear piece will engage with the lug or ear piece of the rack bar and move it for it to engage with the brake rod gear, and as the brake rod is still farther moved the rack bar is also moved communicating motion to the tubular rod and its chain sufficiently to make the electric circuit and put on the electric power setting the car in motion as before described. Thus the simple movement of the brake rod to the right to brake the car operates the switch to break the electric circuit, stopping the electric motor, and by reversing the brake rod to release the brake and leave the car free to be moved, the electric circuit is made and the power put on to the electric motor, moving the car, which power can be increased within certain limits by the continued movement of the brake rod to the left, thus accomplishing practically and successfully with the brake rod and with one hand of the electric motor man in the running of an electric car, what now is accomplished by the brake rod and an extra rod for the electric motor and the use of both hands of the motorman, an advantage which is clearly obvious.

Having thus described my invention, what I claim is—

1. In an electric car, in combination, the rod connected to the brake mechanism for braking the car, a gear secured thereto, a rack bar arranged to slide back and forth in suitable support and engage with said gear, a rod turning in suitable bearings arranged and adapted to be connected to the rheostat or electric controller of the electric motor and a gear secured to said latter rod engaging with the rack bar.

2. In an electric car, in combination, a rod connected to the brake mechanism for braking the car, a gear secured thereto, a miter gear secured thereto, a miter gear turning in a suitable support and engaging with the brake rod miter gear, a lug or ear piece on the separate miter gear, a rack bar arranged to slide back and forth in a suitable support and engage with the gear on said rod, a lug or ear piece on said rack bar, arranged to engage with the lug or ear piece of the miter gear, a rod turning in suitable bearings arranged and adapted to be connected to the rheostat or electric controller of the electric motor and a gear secured to said latter rod engaging with the rack bar.

3. In an electric car, in combination, a rod connected to the brake mechanism for braking the car and a gear secured thereto, a rack bar arranged to slide back and forth in suitable support and to engage with said gear, a tubular rod turning in suitable bearings connected to the rheostat or electric controller of the electric motor, a gear secured to said tubular rod engaging with the rack bar, and a rod extending through said tubular rod, having a handle for operation thereof and arranged and adapted to be connected to the rheostat or electric controller of the electric motor.

In testimony whereof I have hereunto set my hand in the presence of two subscribing witnesses.

ANDREW W. MITCHELL.

Witnesses:
EDWIN W. BROWN,
CARRIE E. NICHOLS.